United States Patent
Inomori et al.

(10) Patent No.: US 7,963,381 B2
(45) Date of Patent: Jun. 21, 2011

(54) MULTI-PLATE CENTRIFUGAL CLUTCH AND VEHICLE EQUIPPED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 437 days.

(21) Appl. No.: 12/273,545

(22) Filed: Nov. 19, 2008

(65) Prior Publication Data

US 2009/0127056 A1 May 21, 2009

(30) Foreign Application Priority Data

Nov. 21, 2007 (JP) ................................ 2007-301715

(51) Int. Cl.
*F16D 43/08* (2006.01)
*F16D 13/74* (2006.01)

(52) U.S. Cl. ............. 192/105 B; 192/70.12; 192/103 A; 192/113.34; 192/113.5; 180/230

(58) Field of Classification Search .............. 192/105 B, 192/103 A, 113.5
See application file for complete search history.

(56) References Cited

U.S. PATENT DOCUMENTS 2,746,555 A * 5/1956 Dalrymple et al. ............. 180/10
2008/0121454 A1* 5/2008 Oishi et al. .................... 180/219

FOREIGN PATENT DOCUMENTS

JP 2003-322177 11/2003
JP 2004-125059 4/2004

* cited by examiner

Primary Examiner — Richard M. Lorence
(74) Attorney, Agent, or Firm — Dickstein Shapiro LLP

(57) ABSTRACT

A centrifugal clutch for a vehicle includes a clutch housing having friction plates, a clutch boss having clutch plates, a pressure plate, and roller weights that press the pressure plate in a direction such that the friction plates and the clutch plates are brought into frictional contact with each other when the roller weights receive a centrifugal force. The vehicle power unit includes a main shaft which has an oil supply passage formed therein. The clutch includes a first oil supply path that supplies oil via the oil supply passage to the friction and clutch plates. The clutch includes a second oil supply path that supplies oil via the oil supply passage to the roller weights. The first and second oil supply paths are formed individually to allow independent adjustment of oil supply to each path.

22 Claims, 5 Drawing Sheets

MULTI-PLATE CENTRIFUGAL CLUTCH AND VEHICLE EQUIPPED WITH THE SAME

PRIORITY INFORMATION

This patent application is based on and claims priority under 35 U.S.C. §119 to Japanese Patent Application No. 2007-301715, filed on Nov. 21, 2007, the entire contents of which is hereby expressly incorporated by reference.

TECHNICAL FIELD

The present invention relates to a multi-plate centrifugal clutch and a vehicle equipped with the same.

BACKGROUND ART

Multi-plate centrifugal clutches are known as, for example, launch clutches for motorcycles and the like. See, for example, Japanese Patent Publication 2003-322177 and Japanese Patent Publication 2004-125059. Japanese Patent Publication 2003-322177 describes a multi-plate centrifugal clutch including a plate group in which a plurality of drive plates and a plurality of driven plates are alternately arranged, a clutch input shaft that rotates together with the drive plates, and a pressure plate having roller weights.

When a motorcycle or the like starts moving, the rotational speed of the clutch input shaft increases and the roller weights receive a centrifugal force. A part of the centrifugal force is converted into a pressing force in a thrust direction, and the plate group is pressed by the pressure plate which receives the pressing force. As a result, the state of the clutch changes from a disengaged state to an engaged state. Conversely, when the motorcycle or the like stops, the rotational speed of the clutch input shaft decreases and the centrifugal force applied to the roller weights is reduced accordingly. As a result, the pressing force applied to the pressure plate is also reduced and the state in which the drive plates and the driven plates are in frictional contact with each other is canceled. Thus, the state of the clutch changes from an engaged state to a disengaged state.

In the above-described multi-plate centrifugal clutch, the clutch input shaft has an oil supply passage that extends in an axial direction and an oil supply channel that extends outward in a radial direction. When the clutch input shaft rotates, oil supplied via the oil passage is ejected from the oil supply channel and sprayed around by the centrifugal force, thereby lubricating the roller weights, the pressure plate, the drive plates, and the driven plates.

In the above-described prior art multi-plate centrifugal clutch, a portion of the oil sprayed from the oil supply aperture in the clutch input shaft is supplied to the roller weights, and the amount of oil supplied to the roller weights is relatively small. In addition, the oil supply line for supplying the oil to the roller weights is the same as the oil supply line for supplying the oil to the plate group. In other words, the oil supplied to the roller weights and the oil supplied to the plate group are ejected from the same oil supply aperture. Therefore, most of the oil ejected from the oil supply aperture is supplied to the plate group, and only a small amount of oil is supplied to the roller weights.

It has been considered unnecessary to supply a large amount of oil to the roller weights because the frictional force generated at the roller weights is not very large. However, the inventors of the present invention have found that abnormal noise is occasionally generated when the roller weights come into contact with an outer peripheral portion of the pressure plate and that the abnormal noise can be reduced by supplying a sufficient amount of oil to the roller weights. Also, the life of the roller weights can be increased and the reliability of the multi-plate centrifugal clutch can be improved by supplying a sufficient amount of oil to the roller weights.

SUMMARY

The present invention has been made in view of the above-described problems. To this end an object of the present invention is to provide a multi-plate centrifugal clutch capable of supplying adequate amount of oil to each of the plate group and centrifugal weight.

A multi-plate centrifugal clutch according to the present invention includes a drive-side rotating body having a plurality of drive plates; a driven-side rotating body having a plurality of driven plates, the drive plates and the driven plates being alternately arranged in a predetermined direction; a rotatable shaft extending in the predetermined direction through the drive-side rotating body and the driven-side rotating body, the rotatable shaft rotating together with one of the drive-side rotating body and the driven-side rotating body; a pressure plate configured to rotate together with the drive-side rotating body, the pressure plate moving in the predetermined direction so as to bring the drive plates and the driven plates into frictional contact with each other; and a centrifugal weight configured to move outward in a radial direction of the pressure plate when the centrifugal weight receives a centrifugal force, thereby pressing the pressure plate in a direction such that the drive plates and the driven plates are brought into contact with each other. An oil supply path for supplying oil is formed in the rotatable shaft so as to extend in an axial direction of the rotatable shaft. The multi-plate centrifugal clutch further includes a plate-side oil supply path configured to supply the oil in the oil supply path toward the drive plates and the driven plates, and a weight-side oil supply path configured to supply the oil in the oil supply path toward the centrifugal weight.

According to the above-described multi-plate centrifugal clutch, the plate-side oil supply path for supplying the oil to the drive plates and the driven plates (hereinafter called a "plate group") and the weight-side oil supply path for supplying the oil to the centrifugal weight are individually formed. The amount of oil supplied to the centrifugal weight is not affected by the amount of oil supplied to the plate group. Therefore, adequate amount of oil can be supplied to the centrifugal weight while supplying an adequate amount of oil to the plate group. As a result, abnormal noise generated by the centrifugal weight can be reduced and abrasion of the centrifugal weight can be suppressed.

According to the present invention, a multi-plate centrifugal clutch capable of supplying adequate amount of oil to each of the plate group and the centrifugal weight can be obtained.

DETAILED DESCRIPTION

A motorcycle with a multi-plate centrifugal clutch 2 according to an embodiment of the present invention mounted thereon will be described in detail with reference to the drawings. The motorcycle 1 and a clutch 2 described below are merely examples according to a preferred embodiment of the present invention. The vehicle according the present invention is not limited to the motorcycle 1 described below. The vehicle according to the present invention is also not limited to conventional motorcycles, such as a motorcycle, a moped, and a scooter, but may also be other types of vehicles like an ATV (All Terrain Vehicle). Accordingly, the term "motorcycle", as used herein, is not to be limited to vehicles having two wheels, and includes vehicles having three or more wheels. In other words, in this specification, the term "motorcycle" is intended to generally refer to vehicles that are designed to be tilted when making a turn.

Figure 1:
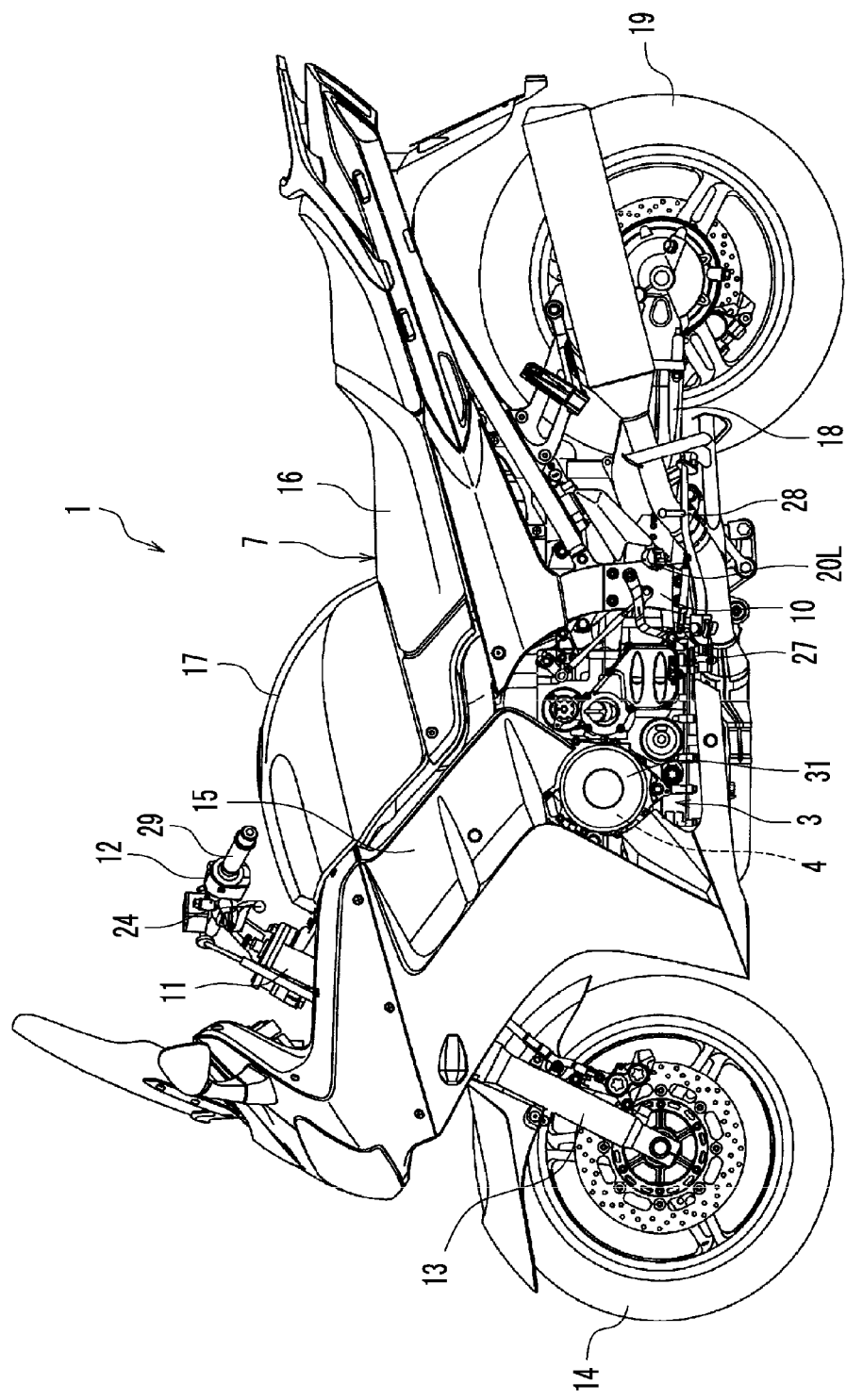
FIG. 1 is a side view of a motorcycle.

FIG. 1 is a left side view of the motorcycle 1 according to an embodiment of the present invention. In the following description, the terms "front", "rear", "left", and "right" refer to directions as viewed from a driver sitting on a seat 16 of motorcycle 1.

Structure of Motorcycle

As shown in FIG. 1, the motorcycle 1 includes a vehicle body 7, a front wheel 14 disposed in a front section of the vehicle body 7, and a rear wheel 19 disposed in a rear section of the vehicle body 7. The vehicle body 7 includes a vehicle body frame 10. The vehicle body frame 10 has a head tube 11. Handlebars 12 are attached to the head tube 11 at a top end thereof. The front wheel 14 is attached to front fork 13 at a bottom end of the head tube 11 such that the front wheel 14 can rotate.

A power unit 3 is suspended from the vehicle body frame 10. In addition, a vehicle body cover 15 is attached to the vehicle body frame 10. The seat 16 is disposed so as to extend rearward from a substantially central position of the vehicle body 7 in the front-rear direction. A fuel tank 17 is disposed in front of the seat 16.

A rear arm 18 is attached to the vehicle body frame 10 such that the rear arm 18 can pivot. A rear wheel 19 is attached to the rear arm 18 at a rear end thereof such that the rear wheel 19 can rotate. The rear wheel 19 is connected to an engine 4 (see FIG. 2) with a power transfer mechanism (not shown) provided therebetween. Power from engine 4 is transferred to the rear wheel 19, and thus the rear wheel 19 is rotated.

An accelerator grip (not shown) is provided on a right section of the handlebars 12. A left grip 29 is provided on a left section of the handlebars 12. A clutch lever 24 which is operated to engage or disengage the clutch 2 (see FIG. 2), which will be described below, is provided on the left section of the handlebars 12 in front of the left grip 29.

A foot rest 20L is disposed on each of left and right sides of the vehicle body 7 at a central position thereof in the front-rear direction. A shift pedal 27 operated to change the transmission gear ratio of a transmission 5 (see FIG. 2), which will be described below, is provided on the left side of the vehicle body 7 at a position slightly in front of the foot rest 20L on the left. A side stand 28 is disposed on the left side of the vehicle body 7 at a position below the shift pedal 27 and the foot rest 20L.

Structure of Power Unit

Figure 2:
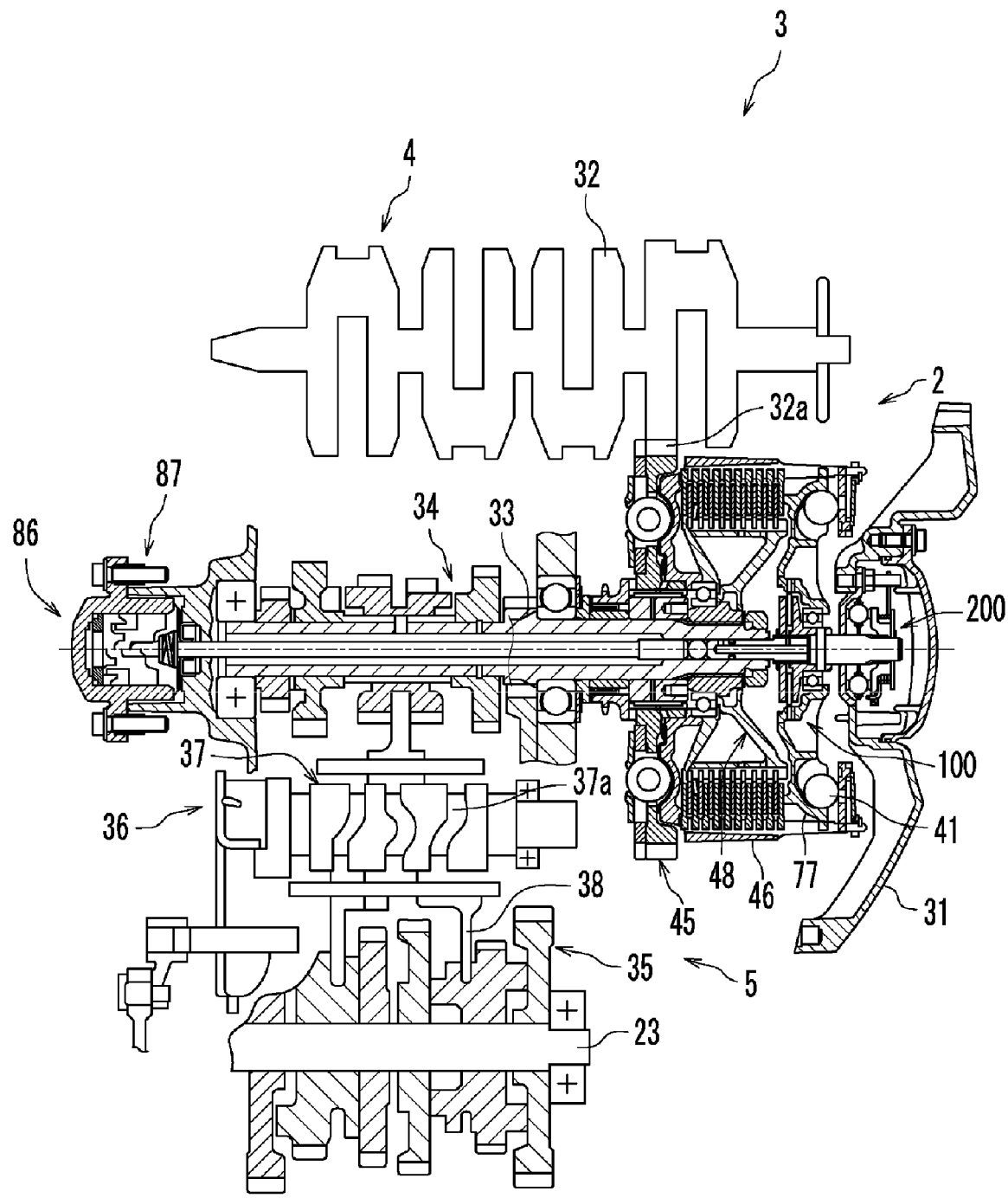
FIG. 2 is a schematic view of the main components of a power unit of the motorcycle of FIG. 1.

The structure of the main components of the power unit 3 will now be described with reference to FIG. 2. As shown in FIG. 2, the power unit 3 includes the engine 4, the transmission 5, and the clutch 2. The type of the engine 4 is not particularly limited. In the present embodiment, the engine 4 is a water-cooled, four-stroke, parallel four-cylinder engine.

Although not shown in the figure, the engine 4 includes four cylinders, pistons that reciprocate in the respective cylinders, and a crank shaft 32 connected to the pistons with connecting rods. The crank shaft 32 extends in a vehicle width direction. Reference numeral 31 denotes a crankcase.

As shown in FIG. 2, the crank shaft 32 is connected to the transmission 5 with the clutch 2 operatively disposed therebetween. The transmission 5 includes a main shaft 33, a drive shaft 23, and a gear selection mechanism 36. The main shaft 33 is connected to the crank shaft 32 with the clutch 2 disposed therebetween. The main shaft 33 and the drive shaft 23 are both arranged generally to the crank shaft 32.

A plurality of transmission gears 34 are attached to the main shaft 33. A plurality of transmission gears 35 corresponding to the transmission gears 34 are attached to the drive shaft 23. Only a selected pair of gears including one of the transmission gears 34 and one of the transmission gears 35 mesh with each other. The gears are structured such that either the transmission gears 34 other than the selected transmission gear 34 can rotate with respect to the main shaft 33, or the transmission gears 35 other than the selected transmission gear 35 can rotate with respect to the drive shaft 23. In other words, either the transmission gears 34 that are not selected rotate freely on the main shaft 33, or the transmission gears 35 that are not selected rotate freely on the drive shaft 23. Thus, rotation is transmitted between the main shaft 33 and the drive shaft 23 only through the selected transmission gear 34 and the selected transmission gear 35 that mesh with each other.

The selection of the transmission gears 34 and 35 is performed by the gear selection mechanism 36 (FIG. 2). More specifically, the selection of the transmission gears 34 and 35 is performed by a shift cam 37 included in the gear selection mechanism 36. A plurality of cam grooves 37a are formed in an outer peripheral surface of the shift cam 37. A shift fork 38 is engaged with each of the cam grooves 37a. Each of the shift forks 38 is engaged with one of the transmission gears 34 and 35 on the main shaft 33 and the drive shaft 23, respectively. When the shift cam 37 rotates, the shift forks 38 move in the axial direction of the main shaft 33 by being guided along the respective cam grooves 37a. Thus, gears to be meshed with each other are selected from the transmission gears 34 and 35. More specifically, among the transmission gears 34 and 35, only the pair of gears disposed at positions corresponding to the rotational angle of the shift cam 37 are fixed to the main shaft 33 and the drive shaft 23 by splines. In this manner, the transmission gear position is determined and rotation is transmitted between the main shaft 33 and the drive shaft 23 through the transmission gears 34 and 35 at a certain transmission gear ratio. The gear selection mechanism 36 is operated by using the shift pedal 27 shown in FIG. 1.

In the above-described structure, when the engine 4 is driven while the selected pair of transmission gears 34 and 35 are fixed to the main shaft 33 and the drive shaft 23 and the clutch 2 is in the engaged state, the power of the engine 4 is transferred to the main shaft 33 through the clutch 2. In addition, rotation is transmitted between the main shaft 33 and the drive shaft 23 through the selected pair of transmission gears 34 and 35 at a certain transmission gear ratio. As a result, the drive shaft 23 is rotated. When the drive shaft 23 is rotated, a drive force is transferred through a transfer mechanism (not shown), such as a chain, which connects the drive shaft 23 to the rear wheel 19. Thus, the rear wheel 19 is rotated. In the present embodiment, a power transfer mechanism that connects the engine 4 to the rear wheel 19 is constituted of the clutch 2, the transmission 5, and the transfer mechanism (not shown) such as the chain.

Clutch Structure

In the present embodiment, the clutch 2 is a wet multi-plate friction clutch. Other suitable clutch configurations may be used as needed. In addition, the clutch 2 is a centrifugal clutch which is automatically engaged or disengaged when the vehicle starts or stops. The clutch 2 can also be engaged or disengaged in response to the operation of the clutch lever 24 by the driver. The structure of the clutch 2 will be described with reference to FIGS. 2, 3, and 4.

Clutch Housing 46

Figure 3:
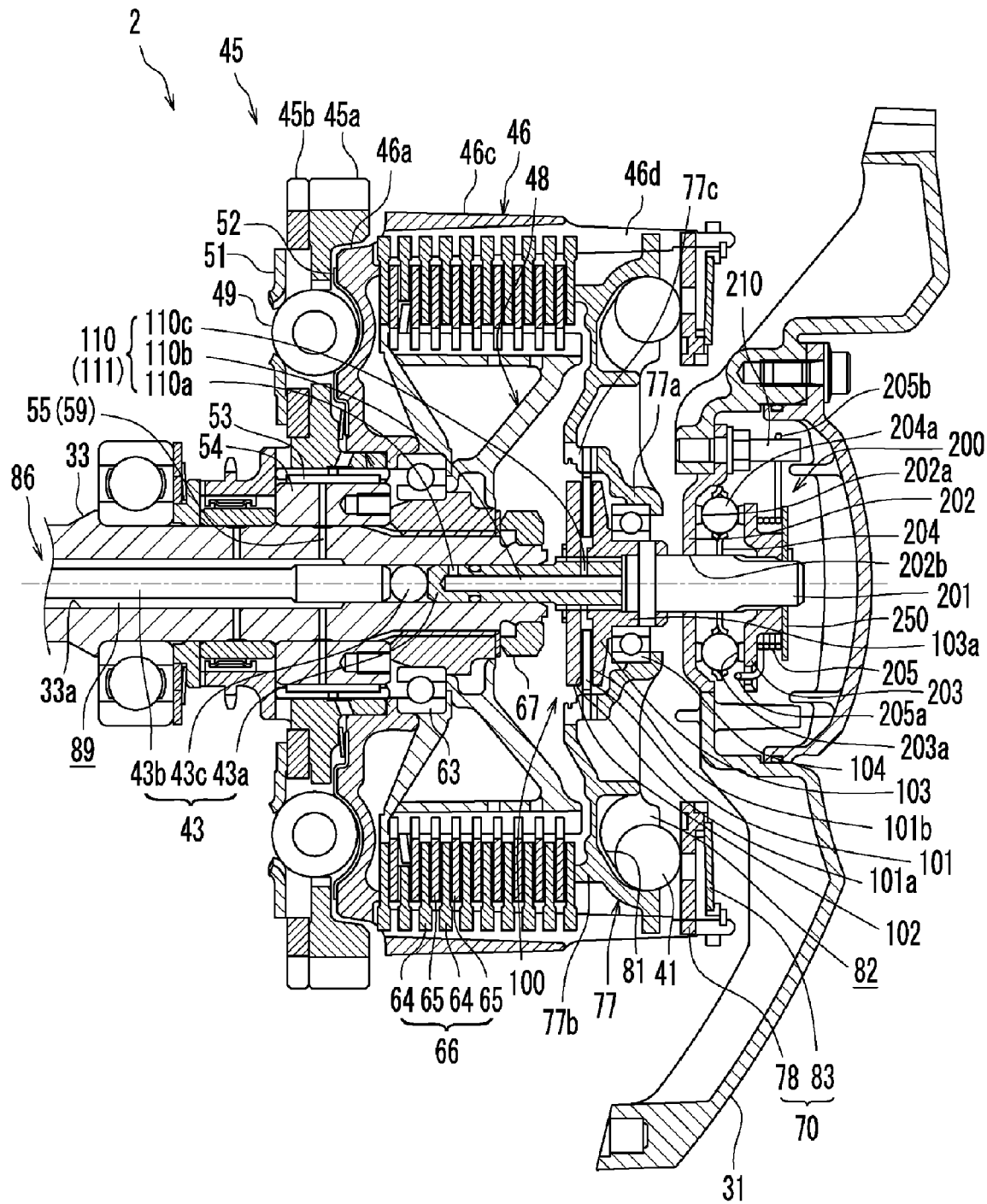
FIG. 3 is a cross-sectional view of a clutch used in the motorcycle of FIG. 1.

As shown in FIG. 3, the clutch 2 includes a clutch housing 46. The main shaft 33 extends through the clutch housing 46. The clutch housing 46 has a housing body 46c. The housing body 46c has a substantially cylindrical shape that is closed at one end thereof by a bottom portion 46a. The main shaft 33 also extends through the bottom portion 46a of the housing body 46c. The housing body 46c has a plurality of pairs of arms 46d. The arms 46d extend outward from the bottom portion 46a in the vehicle width direction.

Referring to FIG. 3, the vehicle width direction refers to the left-right direction. In the present embodiment, the clutch 2 is disposed on the right side of the main shaft 33. Therefore, the outer side in the vehicle width direction corresponds to the right side, and the inner side in the vehicle width direction corresponds to the left side. In the following description, the outer side and the inner side in the vehicle width direction will be referred to simply as the right side and the left side, respectively.

Scissor Gear 45

A scissor gear 45 is attached to the clutch housing 46. The scissor gear 45 includes two gears 45a and 45b, a spring 49, and two plates 51 and 52. The gears 45a and 45b are positioned between the two plates 51 and 52. The two plates 51 and 52 are fixed to each other in the axial direction of the main shaft 33 with fixing parts such as rivets and screws. Thus, the two gears 45a and 45b are substantially fixed to each other in the axial (longitudinal) direction of the main shaft 33. However, the gears 45a and 45b are capable of rotating with respect to each other.

The gears 45a and 45b have the same number of teeth, and are arranged such that the teeth of the gear 45a and the teeth of the gear 45b are alternately positioned in the circumferential direction. The spring 49 is disposed between the gears 45a and 45b. Therefore, the gears 45a and 45b receive torque supplied by the spring 49. Thus, torque variation caused by the engine 4 can be absorbed.

The gear 45a included in the scissor gear 45 meshes with a gear 32a disposed on the crank shaft 32 (see FIG. 2). The gear 45a included in the scissor gear 45 is fixed to the bottom portion 46a of the clutch housing 46 such that the gear 45a cannot rotate with respect to the bottom portion 46a. Due to this structure, the gear 45a (of the scissor gear 45) and the clutch housing 46 rotate together when the crank shaft 32 rotates.

A needle bearing 53 and a spacer 54, which is fixed to the main shaft 33 such that the spacer 54 cannot rotate with respect to the main shaft 33, are disposed between the scissor gear 45 and the main shaft 33. Since the needle bearing 53 is provided, the scissor gear 45 can rotate with respect to the main shaft 33. In other words, the rotation of the scissor gear 45 is not directly transmitted to the main shaft 33.

Clutch Boss 48

A clutch boss 48 is fixed to the main shaft 33 with a nut 67 such that the clutch boss 48 cannot rotate with respect to the main shaft 33. In other words, the clutch boss 48 rotates together with the main shaft 33. A thrust bearing 63 is disposed between the clutch boss 48 and the scissor gear 45. The thrust bearing 63 prevents gaps between the clutch boss 48 and the scissor gear 45, the needle bearing 53, and the spacer 54 from becoming smaller than a predetermined distance. In other words, movement of the scissor gear 45, the needle bearing 53, and the spacer 54 toward the clutch boss 48 in the axial direction of the main shaft 33 is regulated.

Plate Group 66

A plurality of friction plates 64 are arranged in the clutch housing 46. Each friction plate 64 is fixed to the clutch housing 46 with respect to the rotational direction of the main shaft 33. Therefore, the friction plates 64 rotate together with the clutch housing 46. Each of the friction plates 64 is movable in the axial direction of the main shaft 33. Thus, the distance between adjacent friction plates 64 is variable.

The plurality of friction plates 64 are arranged in the axial direction of the main shaft 33. A clutch plate 65 is disposed between adjacent friction plates 64. The clutch plates 65 are disposed so as to face the friction plates 64 positioned next to the clutch plates 65. Each of the clutch plates 65 is fixed to the clutch boss 48 in the rotational direction of the main shaft 33. Therefore, the clutch plates 65 rotate together with the clutch boss 48. Each of the clutch plates 65 is movable in the axial direction of the main shaft 33. Thus, the spacing between adjacent clutch plates 65 is variable.

In the present embodiment, the friction plates 64 and the clutch plates 65 form a plate group 66.

Pressure Plate 77

A pressure plate 77 is disposed on the right side of the main shaft 33 as depicted in FIG. 3. The pressure plate 77 has a substantially disc-like shape. A sub-clutch 100, which will be described below, is provided on the pressure plate 77 at a central section thereof. An outer edge portion of the pressure plate 77 in the radial direction thereof is engaged with a plurality of arms 46d. Therefore, the pressure plate 77 cannot rotate with respect to the clutch housing 46, but rather rotates together with the clutch housing 46.

A boss portion 77a that projects rightward is provided on the pressure plate 77 at a central section thereof. An outer section of the boss portion 77a in the radial direction thereof is formed in a substantially bowl-like shape so as to be inclined rightward toward the outer side in the radial direction.

A pressing portion 77b that projects toward the plate group 66 is formed on the pressure plate 77 at an outer section thereof, as illustrated in FIG. 3. The pressing portion 77b faces the rightmost friction plate 64 in the plate group 66. When the pressure plate 77 moves leftward, the pressing portion 77b pushes the plate group 66 leftward. As a result, the friction plates 64 and the clutch plates 65 in the plate group 66 are brought into frictional contact with each other.

Cam surfaces 81, which retain respective roller weights 41, are formed on the radially outward portion of the pressure plate 77 on a side opposite to the side facing the plate group 66, as shown in FIG. 3. The cam surfaces 81 and the roller weights 41 are provided along the circumferential direction. The cam surfaces 81 are disposed generally radially around the longitudinal axis of the main shaft 33. Each of the cam surfaces 81 is inclined rightward toward the outer side in the radial direction.

Apertures 77c that extend through the pressure plate 77 from the left side to the right side are formed at positions between the boss portion 77a of the pressure plate 77 and the cam surfaces 81. As described below, apertures 77c provide an oil pathway from left to right to the weight-side of the clutch.

A roller retainer 78 is disposed on the right side of the pressure plate 77. The roller retainer 78 has an annular shape when viewed in the axial direction of the main shaft 33. The roller retainer 78 faces the cam surface 81 of the pressure plate 77. Thus, spaces 82, each of which has a width that decreases in the radial direction of the main shaft 33, are defined by the roller retainer 78 and the cam surface 81.

Similar to the pressure plate 77, an outer edge portion of the roller retainer 78 in the radial direction thereof is engaged with the arms 46d. Therefore, the roller retainer 78 cannot rotate with respect to the clutch housing 46. In other words, the roller retainer 78 rotates together with the clutch housing 46. However, the roller retainer 78 is movable with respect to the clutch housing 46 in the axial direction of the main shaft 33.

The roller retainer 78 is biased leftward by a disc spring 83, which functions as a spring-loaded member. In other words, the roller retainer 78 is biased toward the plate group 66 by the disc spring 83. The roller retainer 78 and the disc spring 83 form a contact member 70 that presses the roller weights 41 toward the cam surface 81.

The roller weights 41 are operatively disposed in the respective spaces 82. The roller weights 41 revolve when the clutch housing 46 rotates, and are moved outward in the radial direction along the cam surface 81 due to the centrifugal force generated as the roller weights 41 revolve. When the generated centrifugal force exceeds a predetermined level, the roller weights 41 receive a reactive force from the contact member 70 and press the pressure plate 77 against the plate group 66.

When the rotational speed of the crank shaft 32 is smaller than a predetermined speed, as in an engine idling state, the rotational speed of the clutch housing 46 is also small. Therefore, the centrifugal force applied to the roller weights 41 is relatively small, and the roller weights 41 are at positions relatively close to the inner edge. In this state, the force applied by the roller weights 41 to press the pressure plate 77 leftward is substantially zero. Thus, the plate group 66 is set to a state in which the plate group 66 is not substantially pressed by the pressure plate 77. Therefore, the rotation of the clutch housing 46 is not transmitted to the clutch boss 48. In other words, the clutch 2 is in a disengaged state.

When the rotational speed of the crank shaft 32 increases, the rotational speed of the clutch housing 46 increases accordingly. As the rotational speed of the clutch housing 46 increases, the centrifugal force applied to the roller weights 41 also increases. When the centrifugal force applied to the roller weights 41 exceeds a predetermined level, the roller weights 41 move radially outward. Accordingly, the pressure plate 77 is pressed leftward by the roller weights 41 and is moved toward the plate group 66. As a result, the plate group 66 is set to a frictional contact state and the state of the clutch 2 changes to the engaged state.

When the plate group 66 is set to a frictional contact state and the state of the clutch 2 is changed to the engaged state, the rotation of the clutch housing 46 is transmitted to the clutch boss 48 through the plate group 66. As a result, the clutch boss 48 rotates together with the clutch housing 46.

If the rotational speed of the crank shaft 32 decreases while the clutch 2 is in the engaged state, the centrifugal force applied to the roller weights 41 is reduced. Therefore, the roller weights 41 move inward in the radial direction. As a result, the force applied by the pressure plate 77 to press the plate group 66 is reduced to substantially zero and the state of the clutch 2 is changed to the disengaged state.

As described above, the motorcycle 1 is provided with the centrifugal clutch 2. Therefore, when the vehicle starts or stops, the clutch 2 is automatically engaged or disengaged in accordance with the rotational speed of the engine 4, and it is not necessary to operate the clutch lever 24. As a result, according to the motorcycle 1 of the present embodiment, the burden of operation placed on the driver during starting or stopping the vehicle can be reduced.

Sub-Clutch 100

As shown in FIG. 3, the clutch 2 includes the sub-clutch 100 according to the present embodiment. The sub-clutch 100 includes a friction plate 101, a first pressing plate 102 that faces a left surface (hereinafter called a "first friction surface") 101a of the friction plate 101, and a second pressing plate 103 that faces a right surface (hereinafter called a "second friction surface") 101b of the friction plate 101.

The friction plate 101 is engaged with the pressure plate 77 such that the friction plate 101 rotates together with the pressure plate 77. More specifically, portions of the pressure plate 77 adjacent to the apertures 77c have a plate-like shape that extends in the left-right direction, and function as slide arm portions. Grooves (not shown) are formed in an outer portion of the friction plate 101 in the radial direction thereof. The grooves in the friction plate 101 are engaged with the slide arm portions such that the friction plate 101 can slide along the slide arm portions, and thus the friction plate 101 is configured to rotate together with the pressure plate 77.

The first pressing plate 102 is fixed to a short push rod 43a, which will be described below. Therefore, the first pressing plate 102 moves together with the short push rod 43a in the axial direction of main shaft 33. In addition, the first pressing plate 102 rotates together with the short push rod 43a.

The second pressing plate 103 is fitted to the short push rod 43a by way of matching serrated surfaces. Therefore, the second pressing plate 103 rotates together with the short push rod 43a, but is movable with respect to the short push rod 43a in the axial (longitudinal) direction of main shaft 33. The second pressing plate 103 has a boss portion 103a that extends rightward. The boss portion 103a supports the pressure plate 77 with a bearing 104 interposed therebetween so that the pressure plate 77 can rotate. Therefore, the second pressing plate 103 and the pressure plate 77 can rotate with respect to each other. In addition, the second pressing plate 103 and the pressure plate 77 are configured to move together in the axial direction of main shaft 33.

When the short push rod 43a moves rightward, the first pressing plate 102 also moves rightward. Then, the first pressing plate 102 presses the friction plate 101 against the second pressing plate 103. As a result, the friction plate 101 is pressed between the first pressing plate 102 and the second pressing plate 103. Accordingly, the rotational force of the pressure plate 77 is transmitted to the first pressing plate 102 and the second pressing plate 103 through the friction plate 101.

Thus, the rotational force is applied to the first pressing plate 102 and the second pressing plate 103.

Booster Mechanism

As shown in FIG. 3, the clutch 2 according to the present embodiment includes a booster mechanism 200. The booster mechanism 200 converts a portion of the rotational force of the pressure plate 77 into a force for disengaging the clutch 2, thereby reducing the force required for disengaging the clutch 2. The booster mechanism 200 according to the present embodiment is formed as a so-called ball cam. The booster mechanism 200 includes a slide shaft 201 fixed to the second pressing plate 103, a first cam plate 202, a second cam plate 203, a ball plate 204, and a coil spring 205 that biases the second cam plate 203 in a direction away from the first cam plate 202. A support plate 250 that is in contact with a right end portion of the coil spring 205 so as to support the coil spring 205 is attached to one end of the slide shaft 201.

Figure 5A:
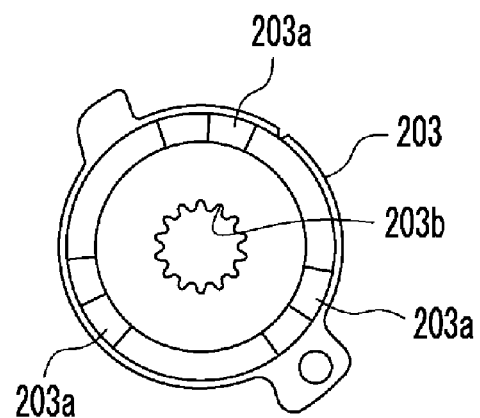
FIG. 5a is a rear view of a second cam plate.
Figure 5B:
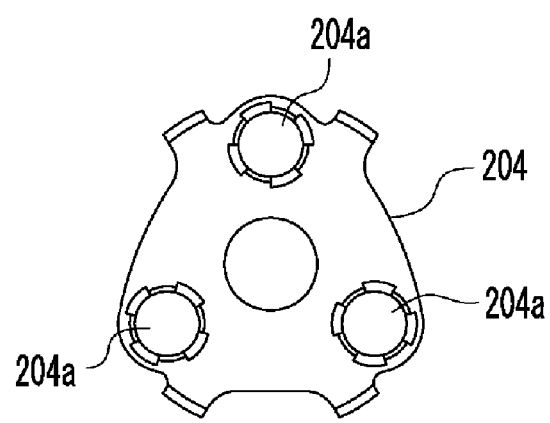
FIG. 5b is a front view of a ball plate.

As shown in FIG. 5(b), three balls 204a are supported on the ball plate 204 in a rollable manner. The three balls 204a are evenly arranged in the circumferential direction around the axial center of the slide shaft 201. The number of balls 204a supported on the ball plate 204 is not limited to three. Other suitable ball cam configurations may be utilized as needed.

Figure 5C:
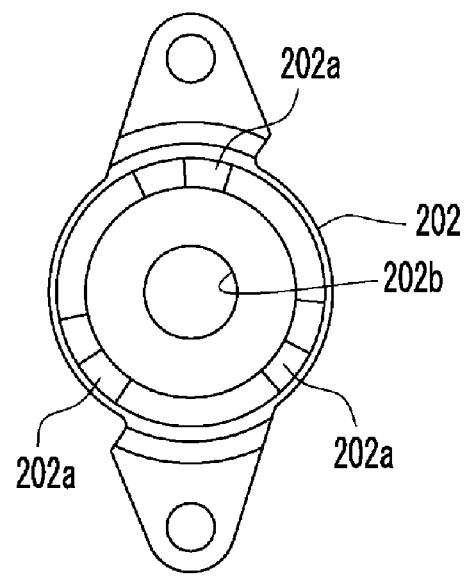
FIG. 5c is a front view of a first cam plate.

As shown in FIG. 5(c), a through hole 202b is formed in the first cam plate 202 at a central section thereof. As shown in FIG. 3, the slide shaft 201 extends through the through hole 202b. The slide shaft 201 is movable with respect to the first cam plate 202 in the axial direction, and is also rotatable with respect to the first cam plate 202. In other words, the first cam plate 202 does not rotate even when the slide shaft 201 rotates.

As shown in FIG. 5(a), a serrated hole 203b is formed in the second cam plate 203 at a central section thereof. The second cam plate 203 is fitted to a corresponding serrated portion on the slide shaft 201. Therefore, the second cam plate 203 is movable with respect to the slide shaft 201 in the axial direction, and rotates together with the slide shaft 201.

As shown in FIG. 3, one end 205a of the coil spring 205 is secured to the second cam plate 203. The other end 205b of the coil spring 205 is secured to a pin 210 fixed to the crankcase 31. Thus, the second cam plate 203 receives a rotational force from the coil spring 205 that urges the second cam plate 203 to rotate about the slide shaft 201 in a predetermined direction discussed below. In addition, the second cam plate 203 receives a sliding force, depending on a total biasing force applied by the disc spring 83 and the coil spring 205, which urges the second cam plate 203 to move toward the first cam plate 202 in the axial direction of the slide shaft 201.

First cam surfaces 202a are formed on the right side of the first cam plate 202 (or the front side of the sheet in FIG. 5c). Second cam surface 203a are formed on the left side of the second cam plate 203 (or see the front side of the sheet in FIG. 5a). The first cam surfaces 202a and the second cam surfaces 203a are shaped such that the balls 204a move out of spaces formed by opposing valleys, or low spots, on the cam surfaces 202a and 203a and ride up on opposing cam lobes of cam surfaces 202a and 203a when the second cam plate 203 rotates in a predetermined direction. The balls 204a then return to the spaces formed by the opposing valleys of cam surface 202a and 203a when the second cam plate 203 rotates in a reverse direction opposite to the predetermined direction. In other words, the cam surface 202a and 203a are shaped such that, when the second cam plate 203 rotates in the predetermined direction against the total biasing force applied by the disc spring 83 and the coil spring 205, the plates 202 and 203 are pushed away from each other by the balls 204a so that the second cam plate 203 is moved rightward. In addition, the cam surface 202a and 203a are shaped such that, when the second cam plate 203 rotates in the reverse direction, the second cam plate 203 moves leftward due to the total biasing force applied by the disc spring 83 and the coil spring 205.

Clutch Release Mechanism 86

Figure 4:
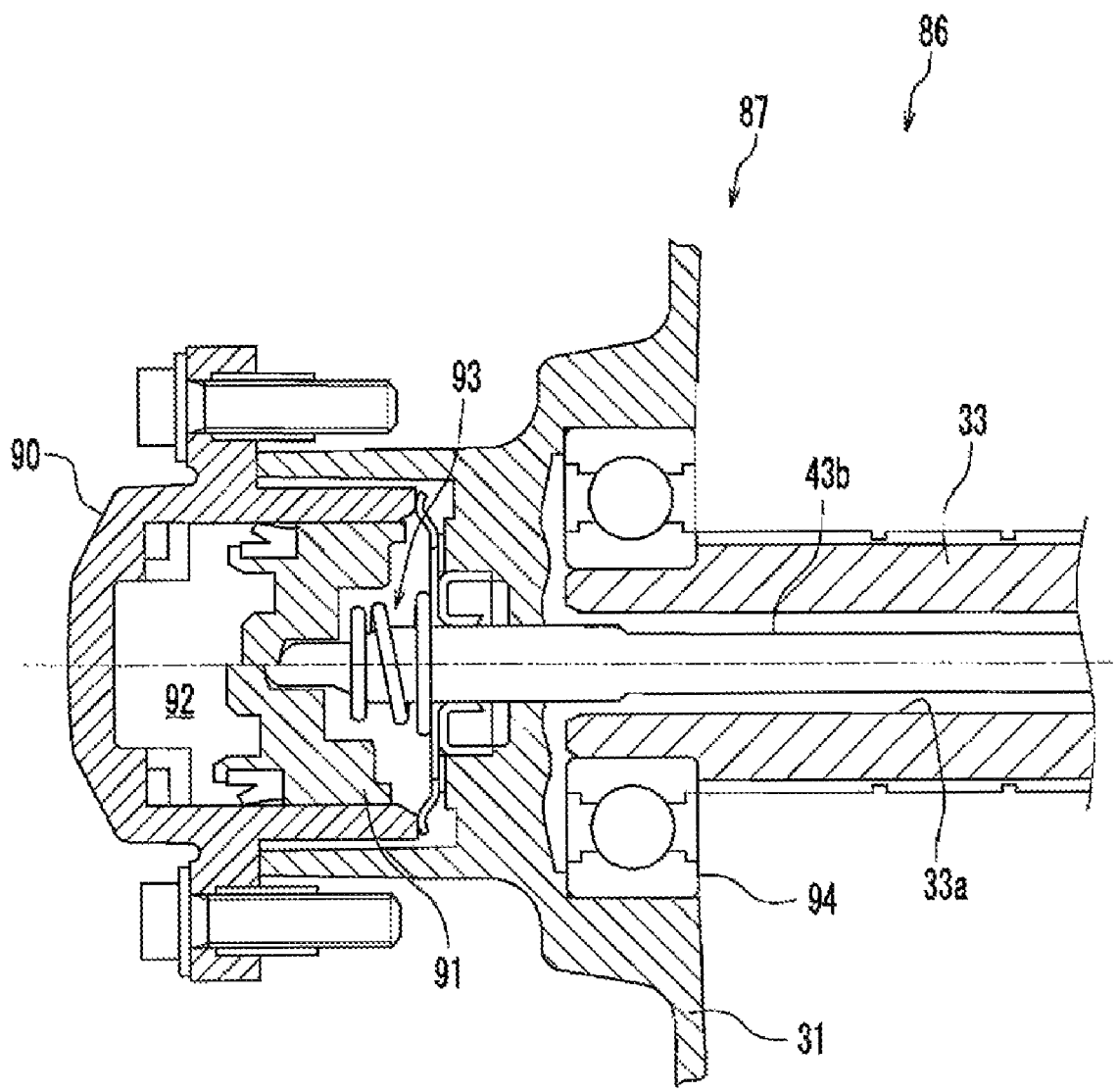
FIG. 4 is a cross-sectional view of a push rod drive mechanism that may be used to disengage the clutch.

The clutch 2 of the present embodiment is provided with a clutch release mechanism 86 (FIG. 4). The clutch release mechanism 86 forcibly cancels the frictional contact state of the plate group 66 when the driver of the motorcycle 1 operates the clutch lever 24. The clutch release mechanism 86 allows the driver of the motorcycle 1 to manually disengage the clutch 2.

The clutch release mechanism 86 includes a push rod 43 (see FIG. 3) and a drive mechanism 87 (see FIG. 3) for drive the push rod 43. As shown in FIG. 3, the push rod 43 includes a short push rod 43a, a long push rod 43b, and a ball 43c disposed between the short push rod 43a and the long push rod 43b. A through hole 33a is formed in the main shaft 33, and the push rod 43 is disposed in the through hole 33a.

A right end of the short push rod 43a projects from the main shaft 33, and is attached to the first pressing plate 102 of the sub-clutch 100. Therefore, when the sub-clutch 100 is engaged, the short push rod 43a rotates together with the pressure plate 77. In addition, when the sub-clutch 100 and the clutch 2 are engaged, the short push rod 43a rotates together with the clutch housing 46. The long push rod 43b does not rotate together with the main shaft 33. Therefore, the ball 43c is provided between the short push rod 43a and the long push rod 43b to reduce the sliding resistance between the short push rod 43a and the long push rod 43b.

FIG. 4 is a cross-sectional view illustrating the push-rod drive mechanism 87. In the present embodiment, as shown in FIG. 4, the long push rod 43b extends into the push-rod drive mechanism 87 and the left end thereof is disposed on the left side of the left end of the main shaft 33. In FIG. 4, a section below the longitudinal axis of the main shaft 33 shows the state in which the clutch release mechanism 86 is not being driven. In other words, the section below the longitudinal axis of the main shaft 33 in FIG. 4 shows the state in which the push rod 43 is shifted relatively to the left and the pressure plate 77 is not moved rightward by the push rod 43. On the other hand, a section above the longitudinal axis of the main shaft 33 in FIG. 4 shows the state in which the clutch release mechanism 86 is being driven. In other words, the section above the longitudinal axis of the main shaft 33 shows the state in which the push rod 43 is shifted relatively to the right and the pressure plate 77 is moved rightward by the push rod 43.

As shown in FIG. 4, the drive mechanism 87 includes a cylinder 90 and a piston 91. The piston 91 is slidable within the cylinder 90 in the axial direction of the main shaft 33. The piston 91 is attached to the long push rod 43b. Therefore, when the piston 91 slides, the long push rod 43b also slides in the axial direction of the main shaft 33.

A space defined by the piston 91 and the cylinder 90 functions as an operation chamber 92. The operation chamber 92 is filled with oil.

A compression coil spring 93 is disposed between the piston 91 and the crankcase 31. The piston 91 is biased leftward by the compression coil spring 93. In other words, the piston 91 is biased in a direction such that the push rod 43 is moved leftward and the clutch 2 becomes engaged. Therefore, when the driver of the motorcycle 1 stops operating the clutch lever 24 (see FIG. 1), the push rod 43 automatically moves leftward.

Oil Supply Path

As described above, the through hole 33a is formed in the rotatable shaft 33. As shown in FIG. 3, a space between the inner wall of the through hole 33a and the push rod 43 forms an oil supply path 89. The oil supply path 89 extends in the axial direction of the rotatable shaft 33, that is, in the left-right direction.

As shown in FIG. 3, channels 55 are formed in a right section of the rotatable shaft 33 so as to extend in the radial direction. The channels 55 communicate with the oil supply path 89. The oil is guided through the oil supply path 89 and is discharged from the channels 55 to lubricate the needle bearing 53 and the thrust bearing 63, and is then supplied to the plate group 66. The path along which the oil flows from the channels 55 to the plate group 66 functions as a plate-side oil supply path 59 that supplies the oil from the oil supply path 89 to the plate group 66.

As described above, the long push rod 43b and the ball 43c are disposed in the through hole 33a formed in the push rod 43. A portion of the short push rod 43a is also disposed in the through hole 33a. An oil passage 110 is formed in the short push rod 43a. The oil passage 110 includes an oil entrance passage 110a formed in a left section of the short push rod 43a, a supply passage 110b formed in a central section of the short push rod 43a, and an oil outlet passage 110c formed in a right section of the short push rod 43a. The oil entrance passage 110a is positioned in the through hole 33a. The oil entrance passage 110a comprises a passage extending in the radial direction, and is connected to the supply path 110b which extends in the axial direction. Similarly, the oil outlet passage 110c comprises a passage that extends in the radial direction, and is connected to the supply passage 110b. The oil outlet passage 110c is positioned outside the through hole 33a. The exit of the oil outlet passage 110c, i.e., the outer end of the oil outlet passage 110c in the radial direction, opens toward the first friction surface 101a and the second friction surface 101b of the friction plate 101.

The oil in the oil passage 110 is supplied to the sub-clutch 100. More specifically, the oil in the oil passage 110 is supplied from the oil outlet passage 110c to the first friction surface 101a and the second friction surface 101b. The oil supplied from the oil passage 110 flows through the sub-clutch 100, and then flows through the apertures 77c in the pressure plate 77 from the left side of the pressure plate 77 to the right side thereof. The oil that reaches the right side of the pressure plate 77 flows outward in the radial direction and is supplied to the cam surface 81 and the roller weights 41. The path along which the oil flows from the sub-clutch 100 to the roller weights 41 and the oil passage 110 function as a weight-side oil supply path 111 that supplies the oil from the oil supply path 89 to the roller weights 41.

Operation of Clutch

The operation of the clutch 2 will now be described. First, the operation of disengaging the clutch 2 will be described.

When the driver of the motorcycle 1 operates the clutch lever 24 (see FIG. 1), the internal pressure of the operation chamber 92 in the drive mechanism 87 increases. Consequently, the piston 91 moves rightward and the long push rod 43b also moves rightward. Accordingly, the ball 43c and the short push rod 43a move rightward and the first pressing plate 102 of the sub-clutch 100 also moves rightward. Thus, the friction plate 101 of the sub-clutch 100 is pressed between the first pressing plate 102 and the second pressing plate 103 and the state of the sub-clutch 100 changes to the engaged state. Accordingly, the slide shaft 201 of the booster mechanism 200 rotates together with the pressure plate 77 in a predetermined direction.

When the slide shaft 201 rotates in the predetermined direction, the second cam plate 203 of the booster mechanism 200 rotates in the same direction. Thus, the balls 204a on the ball plate 204 move out of spaces formed by opposing valleys on the cam surfaces 202a and 203a and ride up on opposing cam lobes of cam surfaces 202a and 203a. The second cam plate 203 is thus pushed rightward by the balls 204a. Accordingly, the slide shaft 201 is also pushed rightward. As a result, the pressure plate 77 is moved rightward by a force applied by the short push rod 43a through the first pressing plate 102 and the friction plate 101 so as to push the pressure plate 77 rightward and a force applied by the slide shaft 201 through the second pressing plate 103 and the bearing 104 so as to pull the pressure plate 77 rightward. Thus, the frictional contact state of the plate group 66 is canceled and the clutch 2 is disengaged.

The rotation of the second cam plate 203 is regulated such that the amount of rotation is less than a predetermined amount. Therefore, after the clutch 2 is disengaged, the friction plate 101 rotates with respect to the first pressing plate 102 and the second pressing plate 103. In other words, the friction plate 101 slides along the first pressing plate 102 and the second pressing plate 103. However, abrasion of the friction plate 101 can be suppressed because oil is supplied to the first friction surface 101a and the second friction surface 101b of the friction plate 101.

Next, the operation of engaging the clutch 2 will be described.

When the clutch 2 is to be engaged, the driver releases the clutch lever 24, and the internal pressure of the operation chamber 92 in the drive mechanism 87 decreases. Accordingly, the piston 91 and the long push rod 43b move leftward. The ball 43c and the short push rod 43a also move leftward, and accordingly the first pressing plate 102 of the sub-clutch 100 moves leftward. As a result, the first pressing plate 102 of the sub-clutch 100 moves away from the friction plate 101. In addition, the first pressing plate 102 stops pushing the second pressing plate 103 rightward. Therefore, the rightward pressing force that was being applied to the slide shaft 201 is eliminated and the second cam plate 203, which receives the biasing force applied by the coil spring 205, rotates in the reverse direction. Thus, the second cam plate 203 and the slide shaft 201 move leftward. As a result, the second pressing plate 103 also moves leftward.

In addition, because the rightward pressing force that was being applied to the pressure plate 77 by the first pressing plate 102 has been eliminated, the pressure plate 77 moves leftward by the biasing force applied by the disc spring 83 and the like. As a result, the pressure plate 77 comes into pressure contact with the plate group 66 and the state of the clutch 2 changes to the engaged state. At this time, the friction plate 101 of the sub-clutch 100 moves away from the second pressing plate 103.

In the clutch 2 according to the present embodiment, the biasing force applied to the pressure plate 77 by the disc spring 83 changes in accordance with the position of the roller weights 41 in the radial direction. More specifically, when the rotational speed of the pressure plate 77 is high, the roller weights 41 move outward in the radial direction. As a result, the roller weights 41 move rightward and greatly deform the disc spring 83. Since the disc spring 83 can be significantly deformed by the roller weights 41, even if the elastic modulus of the disc spring 83 itself is not increased, the biasing force applied to the pressure plate 77 by the disc spring 83 becomes relatively large. When the rotational speed of the pressure plate 77 is relatively small, the roller weights 41 move inward in the radial direction. As a result, the roller weights 41 move leftward and the amount of deformation of the disc spring 83 decreases. Thus, the biasing force applied to the pressure plate 77 by the disc spring 83 becomes relatively small.

When the rotational speed of the engine is high, it is necessary to cause the pressure plate 77 to press the plate group 66 with a large pressing force. In the clutch 2 according to the present embodiment, when the rotational speed of the engine increases, the roller weights 41 move outward in the radial direction and the amount of deformation of the disc spring 83 increases accordingly. Therefore, sufficiently large pressing force can be obtained without increasing the elastic modulus of the disc spring 83. Thus, the disc spring 83 with a relatively small elastic modulus, that is, spring capacity, can be used.

In the idling state or the like in which the rotational speed is low, the roller weights 41 move inward in the radial direction and the state in which the pressure plate 77 is in pressure contact with the plate group 66 is canceled. In other words, the clutch is disengaged. When the rotational speed of the engine increases from that in the idling state, the roller weights 41 move outward in the radial direction and the pressure plate 77 comes into pressure contact with the plate group 66. In other words, the clutch becomes engaged. In the clutch 2 according to the present embodiment, the elastic modulus of the disc spring 83 is relatively small. In addition, at the time when the clutch becomes engaged, the rotational speed of the engine is not very high and the amount of deformation of the disc spring 38 is relatively small. Therefore, the force applied by the pressure plate 77 so as to press the plate group 66 is relatively weak. Thus, the plate group 66 is prevented from being suddenly pressed and the clutch 2 is smoothly engaged.

ADVANTAGES OF THE EMBODIMENT

As described above, the clutch 2 according to the present embodiment includes the plate-side oil supply path 59 that supplies the oil in the oil supply path 89 to the plate group 66 and a weight-side oil supply path 111 that supplies the oil in the oil supply path 89 toward the roller weights 41. In other words, according to the present embodiment, the plate-side oil supply path 59 and the weight-side oil supply path 111 are individually formed. Therefore, the amount of oil supplied to the roller weights 41 is not affected by the amount of oil supplied to the plate group 66. In other words, the amount of oil supplied to the roller weights 41 and the amount of oil supplied to the plate group 66 can be adjusted independently of each other. Therefore, an adequate amount of oil can be supplied to the roller weights 41 while supplying an adequate amount of oil to the plate group 66. As a result, abnormal noise generated by the roller weights 41 can be reduced and abrasion of the roller weights 41 and the pressure plate 77 can be suppressed.

According to the present embodiment, the pressure plate 77 has the cam surfaces 81 that are shaped so as to move the roller weights 41 away from the plate group 66 as the roller weights 41 move outward in the radial direction. The roller weights 41 are positioned on the cam surfaces 81 such that the roller weights 41 are separated from the plate group 66 by the pressure plate 77.

Since the roller weights 41 are separated from the plate group 66 by the pressure plate 77, the oil supplied through the plate-side oil supply path 59 and the oil supplied through the weight-side oil supply path 111 are prevented from mixing with each other. Therefore, an adequate amount of oil can be supplied to each of the plate group 66 and the roller weights 41.

According to the present embodiment, the weight-side oil supply path 111 supplies the oil in the direction from left to right. In addition, the apertures 77c that extend through the pressure plate 77 from the left side to the right side are formed at positions between the boss portion 77a of the pressure plate 77 and the cam surface 81. The weight-side oil supply path 111 includes the oil outlet passage 110c from which the oil is discharged toward the left side of the pressure plate 77.

Thus, the oil discharged from the oil outlet passage 110c of the weight-side oil supply path 111 is supplied to the left side of the pressure plate 77. Then, the oil passes through the apertures 77c to the right side of the pressure plate 77 and is supplied to the roller weights 41. Thus, although the plate group 66 is separated from the roller weights 41 by the pressure plate 77, the oil can be supplied from the left side of the pressure plate 77. On the other hand, if the oil were to be supplied to the right side of the boss portion 77a that projects rightward, the oil supply path from the oil supply path 89 to the roller weights 41 would include a detour path along which the oil flows leftward on the boss portion 77a that projects rightward. However, according to the present embodiment, the oil supply path from the oil supply path 89 to the roller weights 41 does not include such a detour path. Therefore, the oil can be smoothly supplied to the roller weights 41.

According to the present embodiment, the through hole 33a is formed in the rotatable shaft 33. A portion of the push rod 43 including the short push rod 43a, the ball 43c, and the long push rod 43b is placed in the through hole 33a. The oil supply path 89 is formed in the space between the inner wall of the through hole 33a in the rotatable shaft 33 and the outer wall of the push rod 43. In addition, a portion of the plate-side oil supply path 59 is formed as the apertures 55 that extend in the radial direction in the rotatable shaft 33, and a portion of the weight-side oil supply path 111 is formed as the oil path 110 in the short push rod 43a.

According to the above-described structure, the clutch 2, which includes the plate-side oil supply path 59 and the weight-side oil supply path 111 formed individually, can be designed to have a small size.

The clutch 2 according to the present embodiment includes the booster mechanism 200 that receives the rotational force of the pressure plate 77 and generates a force that moves the pressure plate 77 rightward, and the sub-clutch 100 that transmits the rotational force of the pressure plate 77 to the booster mechanism 200 in a disconnectable manner. The sub-clutch 100 includes the friction plate 101 configured to rotate together with the pressure plate 77 and the second pressing plate 103. When the clutch is to be disengaged, the second pressing plate 103 is brought into frictional contact with the friction plate 101 so that the second pressing plate 103 receives rotational force from the pressure plate 77 and transmits the rotational force to the booster mechanism 200. The weight-side oil supply path 111 includes the oil outlet path 110c that opens toward the sub-clutch 100 to supply the oil to the roller weights 41 through the sub-clutch 100.

Thus, according to the present embodiment, the sub-clutch 100 can be lubricated by the oil supplied through the weight-side oil supply path 111. The amount of oil necessary for the roller weights 41 is relatively smaller than the amount of oil necessary for the sub-clutch 100. Therefore, even if a portion of the oil is sprayed from the sub-clutch 100, a sufficient amount of oil can be supplied to the roller weights 41. Therefore, no practical problems occur even though the oil is supplied to the roller weights 41 through the sub-clutch 100.

In addition, according to the present embodiment, the amount of oil supplied to the plate group 66 and the amount of oil supplied to the sub-clutch 100 can be individually adjusted. Therefore, an adequate amount of oil can be supplied to each of the plate group 66 and the sub-clutch 100.

According to the present embodiment, the roller weights 41 that roll outward along the cam surface 81 of the pressure plate 77 in the radial direction when the centrifugal force is applied thereto are used as the centrifugal weights in the clutch 2. In the case where rotating bodies are used as centrifugal weights, as described above, abrasion between the centrifugal weights and the cam surface 81 can be further suppressed and the life of the clutch 2 can be increased. However, weights that slide along the cam surface 81 may also be used as the centrifugal weights. The centrifugal weights are not limited to the roller weights 41.

Modification

According to the above-described embodiment, in the idling state in which the rotational speed of the crankshaft is low, the clutch is set to a state in which the pressure plate 77 is not in pressure contact with the plate group 66, that is, the clutch is in a disengaged state. However, the biasing force applied by the disc spring 83 and the coil spring 205 may be adjusted such that even in the idling state or the like in which the rotational speed is low, the clutch can be set to a state in which the pressure plate 77 is in pressure contact with the plate group 66. In other words, the biasing force may be adjusted such that the clutch can be set to a so-called half-clutch state.

As described above, the present invention can be applied to a multi-plate centrifugal clutch and a vehicle equipped with the same.

What is claimed:

1. A multi-plate centrifugal clutch, comprising:
   a first rotating body having a plurality of drive plates;
   a second rotating body arranged coaxially with the first rotating body and having a plurality of driven plates, the drive plates and the driven plates being alternately arranged in a predetermined direction;
   a rotatable shaft extending coaxially through the first and second rotating bodies, the rotatable shaft being rotatably fixed to one of the first and second rotating bodies;
   a pressure plate configured to rotate together with the first rotating body, the pressure plate adapted to move in the predetermined direction to bring the drive plates and the driven plates into frictional contact with each other;
   at least one centrifugal weight configured to move outward in a radial direction of the pressure plate in response to centrifugal force applied to the centrifugal weight and thereby press the pressure plate in a direction such that the drive plates and the driven plates are brought into frictional contact with each other;
   a first oil supply path configured to supply oil to the drive plates and the driven plates; and
   a second oil supply path configured to supply oil to the at least one centrifugal weight.

2. The multi-plate centrifugal clutch of claim 1, wherein the pressure plate has at least one cam surface on a side opposite to the side facing the drive plates and the driven plates, the at least one cam surface guiding the at least one centrifugal weight to move away from the drive plates and the driven plates as the at least one centrifugal weight moves outward from the rotatable shaft in the radial direction.

3. The multi-plate centrifugal clutch of claim 2, wherein the at least one centrifugal weight is disposed on the at least one cam surface such that the at least one centrifugal weight is separated from the drive plates and the driven plates by the pressure plate.

4. The multi-plate centrifugal clutch of claim 3, wherein the second oil supply path supplies the oil in a direction from the drive plates and the driven plates toward the pressure plate through the rotatable shaft.

5. The multi-plate centrifugal clutch of claim 4, wherein the pressure plate has a boss portion at a central section thereof, the boss portion projecting in a direction away from the drive plates and the driven plates.

6. The multi-plate centrifugal clutch of claim 5, wherein the at least one cam surface is formed outside the boss portion in the radial direction.

7. The multi-plate centrifugal clutch of claim 6, wherein apertures are formed in the pressure plate so as to extend from one side to the other side of the pressure plate at locations between the boss portion and the cam surface.

8. The multi-plate centrifugal clutch of claim 7, wherein the second oil supply path includes an oil outlet passage through which the oil is guided to the one side of the pressure plate.

9. The multi-plate centrifugal clutch of claim 1, wherein the rotatable shaft has a hole that extends in an axial direction of the rotatable shaft.

10. The multi-plate centrifugal clutch of claim 9, further comprising a clutch release mechanism configured to move the pressure plate in the axial direction away from the drive plates and the driven plates, the clutch release mechanism including a rod having one or more components that are in contact with each other, at least a portion of the rod being inserted in the hole that extends in the axial direction of the rotatable shaft.

11. The multi-plate centrifugal clutch of claim 10, wherein each of the first and second oil supply paths is partially formed as a passage between an inner wall of the hole in the rotatable shaft and an outer wall of the rod.

12. The multi-plate centrifugal clutch of claim 1, further comprising:
    a booster mechanism configured to receive a rotational force from the pressure plate when the clutch is to be disengaged and convert the rotational force into a force that moves the pressure plate in a direction such that the drive plates and the driven plates move away from each other; and
    a sub-clutch provided in a central area of the pressure plate, the sub-clutch transferring the rotational force of the pressure plate to the booster mechanism in a disconnectable manner.

13. The multi-plate centrifugal clutch of claim 12, wherein the sub-clutch includes a friction plate configured to rotate together with the pressure plate, and a rotational-force transferring member that receives the rotational force from the pressure plate by being brought into frictional contact with the friction plate when the clutch is to be disengaged and transfers the rotational force to the booster mechanism.

14. The multi-plate centrifugal clutch of claim 13, wherein the second oil supply path includes an oil outlet passage that opens toward the sub-clutch to supply the oil to the at least one centrifugal weight through the sub-clutch.

15. The multi-plate centrifugal clutch of claim 1, wherein the at least one centrifugal weight is implemented as a roller weight that rolls outward in the radial direction under the influence of the centrifugal force.

16. A vehicle comprising the multi-plate centrifugal clutch of claim 1.

17. The multi-plate centrifugal clutch of claim 1, wherein the first and second oil supply paths are formed individually, thereby allowing independent adjustment of oil supply to each path.

18. The multi-plate centrifugal clutch of claim 1, further comprising a clutch release mechanism which forcibly cancels the frictional contact state of the drive plates and the driven plates when a clutch lever is manually operated.

19. The multi-plate centrifugal clutch of claim 1, further comprising a spring-loaded member biasing the pressure plate toward the drive plates and the driven plates via the at least one centrifugal weight, wherein the biasing force applied to the pressure plate by the spring-loaded member varies in accordance with the position of the at least one centrifugal weight in the radial direction.

20. The multi-plate centrifugal clutch of claim 12, wherein the booster mechanism is formed as a ball cam.

21. A motorcycle, comprising:
an engine that generates a drive force;
a drive wheel;
a centrifugal clutch configured to transmit the drive force from the engine to the drive wheel, the centrifugal clutch comprising a pressure plate, a biasing member, a clutch plate group, and a centrifugal weight disposed on a cam surface extending in a radial direction formed on a side of the pressure plate opposite the plate group and interposed between the pressure plate and the biasing member, the pressure plate biased by the biasing member in a predetermined direction to press the clutch plate group into frictional contact and transmit torque from the engine to the drive wheel when the centrifugal weight moves outward in a radial direction of the pressure plate in response to centrifugal force applied to the centrifugal weight
a clutch actuating element configured to disengage the centrifugal clutch when activated by a rider;
a first oil supply path configured to supply oil to the clutch plate group; and
a second, independent oil supply path configured to supply oil to the at least one centrifugal weight, the second oil supply path including a hole through the pressure plate.

22. The motorcycle of claim 1, further comprising a sub-clutch disposed in a central portion of the pressure plate, the sub-clutch configured to selectively transfer rotational force of the pressure plate to a device that converts the rotational force into a force that moves the pressure plate in a direction away from the plate group, wherein the second oil supply path includes the sub clutch.

* * * * *